United States Patent [19]

Christie et al.

[11] 3,823,248

[45] July 9, 1974

[54] BUS INCORPORATING CURRENT LIMITING REACTANCE

[75] Inventors: Donald M. Christie, Guelph, Ontario; Ronald W. Lye; Robert H. Rehder, both of Peterborough, Ontario, all of Canada

[73] Assignee: Canadian General Electric Company Limited, Toronto, Ontario, Canada

[22] Filed: Feb. 28, 1973

[21] Appl. No.: 336,795

[30] Foreign Application Priority Data

July 13, 1972 Canada .................................. 146995

[52] U.S. Cl. .............. 174/16 B, 174/99 B, 307/93, 307/147, 317/20, 317/44
[51] Int. Cl. ....... H02g 5/06, H02h 9/02, H02h 7/22
[58] Field of Search ......... 174/13, 16 B, 68 B, 70 B, 174/99 R, 99 B, 99 E; 307/92, 93, 147; 317/11 C, 16, 20, 32, 44; 336/223

[56] References Cited
UNITED STATES PATENTS

| | | | |
|---|---|---|---|
| 1,738,528 | 12/1929 | Dunlop | 336/223 X |
| 2,024,957 | 12/1935 | Van de Graaff | 174/99 R X |
| 3,479,444 | 11/1969 | Hus | 174/99 E X |
| 3,654,378 | 4/1972 | Rehder | 174/99 B X |

FOREIGN PATENTS OR APPLICATIONS

| | | | |
|---|---|---|---|
| 858,102 | 5/1940 | France | 174/13 |
| 1,162,919 | 2/1964 | Germany | 174/13 |
| 1,034,634 | 6/1966 | Great Britain | 174/13 |

*Primary Examiner*—Laramie E. Askin
*Attorney, Agent, or Firm*—William Freedman; J. Wesley Haubner

[57] ABSTRACT

A bus duct run, consisting of a rigid tubular conductor supported inside a rigid enclosure, has a current limiting reactance incorporated in the conductor. The reactance is obtained from a portion of the conductor formed into a helix with spaced-apart turns. The helix may be a tubular conductor cut helically or a conductor wound helically.

5 Claims, 4 Drawing Figures

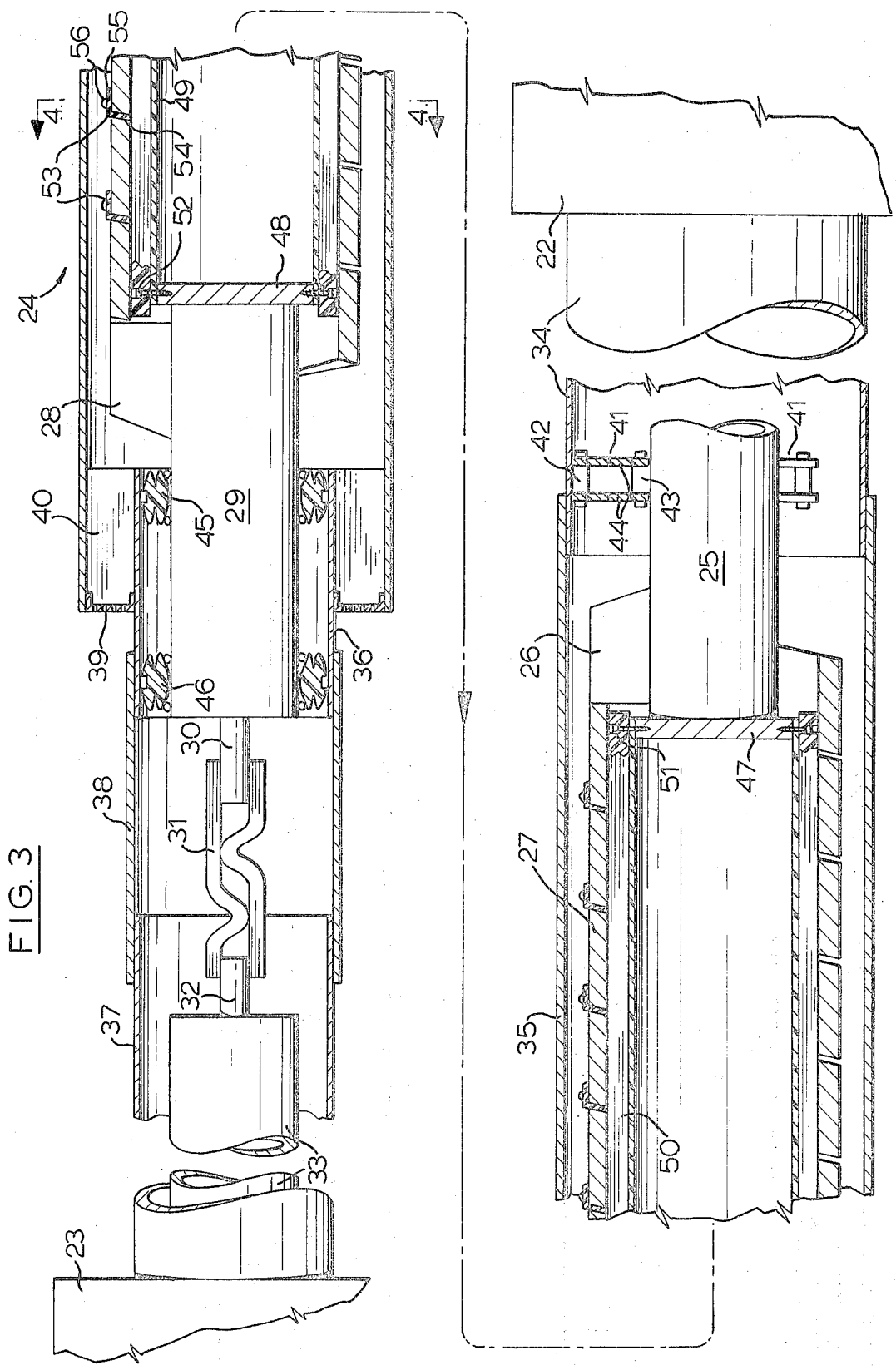

BUS INCORPORATING CURRENT LIMITING REACTANCE

BACKGROUND

This invention relates to bus duct assemblies in which the bus includes current limiting reactance.

Runs of rigid conductors located inside rigid enclosures are now used extensively in power generating, converting and distributing stations where high voltage and high amperage electrical energy is transmitted short distances. These conductors and enclosures therefor are better known as bus duct assemblies, and they are used in locations where live conductors must be isolated electrically for the safety of the people working in their vicinity.

In some installations where bus duct is the conductive circuit between two pieces of electrical equipment, the circuit also includes reactors for purposes of limiting the current in the event of an electrical failure. An example of such an installation is a rectifier cubicle connected to a current distributing cubicle by means of a bus duct run. The reactance of the reactor placed in the interconnecting circuit limits the short circuit current to a value acceptable to the rectifier, should a fault occur in the load circuit. Heretofore, the reactors provided were separate units connected in the bus run between the two cubicles.

SUMMARY

The object of this invention is to incorporate current limiting reactance in a bus duct assembly and thereby dispense with separate reactor units.

According to the invention a bus duct run, consisting of a rigid tubular conductor supported inside a rigid enclosure, has a current limiting reactance incorporated in the conductor. The reactance is obtained from a portion of the conductor formed into an open helix with spaced-apart turns. The helix may be a tubular conductor cut helically or a conductor wound helically.

BRIEF DESCRIPTION OF DRAWINGS

The invention will now be described in detail in connection with the accompanying drawings, in which

FIG. 3 is a bus duct assembly constructed according to the invention for connecting a rectifier to a load distribution centre.

DETAILED DESCRIPTION OF PREFERRED EMBODIMENTS

Figure 1:
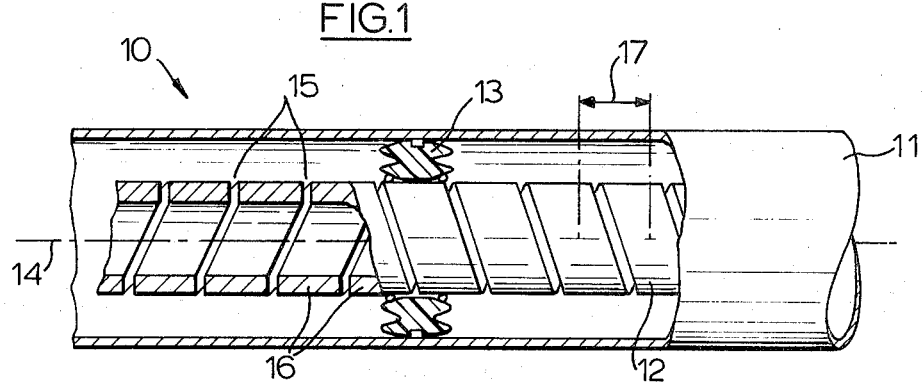
FIG. 1 is a view in section of a helical conductor supported inside a duct.

Referring now to FIG. 1 where there is shown a length of a bus duct assembly 10 consisting of a circular duct 11, a helical conductor 12, and an annular insulator 13, which insulator is one of a plurality spaced along the length of the duct for supporting the conductor on the center line 14 of the duct. Conductor 12 is a circular tube of aluminum or copper cut helically at 15 into a plurality of spaced-apart turns 16 electrically connected in series with each other. It could also be a conductor wound helically into a plurality of turns 16 spaced one from another by the distance provided by cut 15 in the former instance. The pitch 17 of turns 16 can vary, and it will depend chiefly on the inductance wanted and the length of tube available for cutting. Usually, the axial length of the helical conductor 12 will be a portion of the overall length of the bus run. However, in the case of very short runs, it could extend the full length of the run.

Figure 2:
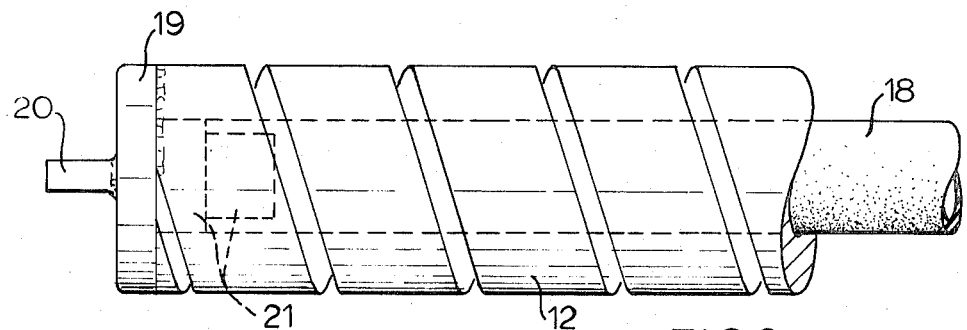
FIG. 2 is a view of a helical conductor and an internal support for the conductor.

In some cases the helical turns 16 of conductor 12 may be too flexible to be self-supporting between insulators 13, in which case additional support is provided. FIG. 2 illustrates means for providing such additional support. This support means comprises a rigid and strong insulating tube 18 positioned inside the helix of conductor 12, which insulating tube extends at least the axial length of the helix. Tube 18 is a loose enough fit inside conductor 12 that it is readily inserted and yet tight enough to hold turns 16 in place during abnormal as well as normal currents. Tubes, such as 18, wound from glass filaments impregnated with either polyester or epoxy resin are found to be strong, rigid, and good electrical insulators.

The ends of conductor 12 and insulating tube 18 can be terminated as shown in FIG. 2 at the left. This termination consists of a terminating disc 19 welded to the end of conductor 12, a terminating pad 20 welded to disc 19, and a plug 21 fitted into the end of tube 18 and welded to disc 19. Plug 21 supports the end of tube 18, and it in turn is supported by the conductor through the medium of disc 19. Hence the conductor, the termination, and the insulating tube cooperate in providing a rigid enough structure that will withstand short circuit currents.

The reactor structure described above is well suited for current limiting purposes and has a number of applications, such as in the isolated phase bus duct described in U.S. Pat. No. 3,654,378—Rehder, assigned to the assignee of the present invention. FIG. 3 illustrates another use for the invention in the DC side of a rectifier for limiting the current to a value safe for the rectifier. This figure shows one of two identical bus-reactor assemblies adapted for use in a circuit connecting the DC terminals of the rectifier to the terminals of a distribution center.

Figure 4:
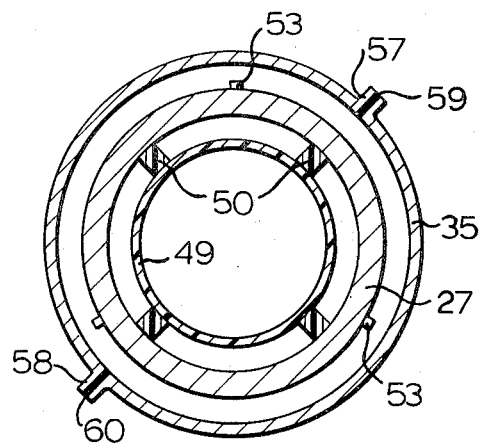
FIG. 4 is a section taken along 4—4 of FIG. 3. It is on the same sheet as FIGS. 1 and 2.

Referring now to FIGS. 3 and 4, numeral 22 designates a cubicle containing a rectifier, 23 a cubicle containing a distribution center, and 24 one of the two conductor assemblies connecting the rectifier to the center. The electrical path from the rectifier to the center of each assembly 24 consists of the following conductors: tubular bus 25, pad 26, helical conductor 27, pad 28, tubular bus 29, terminal 30, flexible connection 31, terminal 32, and tubular bus 33. Conductors 25 to 33 are enclosed in a duct assembly extending from cubicle 22 to cubicle 23 and comprising the tubular enclosures 34 to 37, cover 38 and grille 39, the longitudinal center line of the string of conductors being located on the center line of the string of enclosures or as close thereto as possible. The enclosure assembly is a rigid structure suitably supported by the cubicles and other means (not shown). Enclosure 34 is attached to cubicle 22 and enclosure 35; enclosure 35 is also attached to enclosure 36 by means of a number of radial ribs 40 which also provide support for grille 39; enclosure 37 is attached to cubicle 23; and cover 38 fits around the adjacent ends of enclosures 36 and 37 so as to cover connection 31.

Bus 25 is supported by cubicle 22 and enclosure 34 on insulators (not shown) located within the cubicle and additional insulators 41. Three insulators 41 equally spaced angularly around the bus may be provided at spaced intervals along the length of the bus. The insulator 41 completely shown consists of lugs 42, 43 welded to the duct and bus respectively and a pair of insulating links 44 bolted to the lugs, the assembly 42, 43 and 44 resembling a link of a chain. Bus 29 is supported on duct 36 by means of two annular insulators 45 and 46. Bus 33 can be supported on annular insulators or in some other known way, no supports being shown in the drawing.

The support for helical conductor 27 will now be described. A disc 47 is welded to the right hand end of bus 25 and a similar disc 48 is welded to the left hand end of bus 29, the discs being coaxial with respect to the buses. These discs support a circular insulating tube 49 which has its ends fitted snugly over the discs. A number of insulating ribs 50 are supported on the outer peripheral surface of tube 49. These ribs 50 (four shown in FIG. 4) are spaced equally around the tube, and extend axially along the full length of the tube. A screw 51 secures the right hand end of each rib to disc 47 and a screw 52 secures the left hand end of each rib to disc 48. These screws are counter sunk deeply enough into the ribs that their heads lie well below the outer edges of the ribs, and they also secure tube 49 against axial movement. In effect, the tube 49, ribs 50 and two buses 25 and 29 act as a single structural member to forces developed by overcurrents in the circuit. A suitable tube 49 is one wound with crisscrossing glass fibres impregnated with a polyester or an epoxy resin. These materials produce a very strong and rigid tube. Ribs 50 may also be made from polyester or epoxy resin reinforced with glass fibres, e.g., cut from a sheet of this material.

Helical conductor 27 rests on the outer edges of ribs 50 and has its ends secured to pads 26 and 28 respectively. Pad 26 is welded to bus 25 and the right hand end of the helical conductor, and pad 28 is welded to bus 29 and the left hand end of the helical conductor. Tube 49 and ribs 50 provide a rigid support for the helical conductor and tie buses 25 and 29 together. It should be noted that the helical conductor has free space along both its inner and outer surfaces. These spaces are used for passing cooling air both inside and outside the conductor as will be described later.

In the FIGS. 3 and 4 assembly, a number of clips 53 are used to hold the convolutions of helical conductor 27 in place on the support 49, 50, i.e., to keep the convolutions from touching one another. Each clip 53 consists of a short strip of insulating board having a portion 54 located between two adjacent conductor turns and a bent over tab 55 secured to the outer surface of the conductor by means of a small self-tapping screw 56 driven into a hole in the conductor. The clips are located at approximately 120 degrees intervals around the helical conductor.

Since helical conductor 27 has a much longer current path than the regular bus, it requires more cooling. This additional cooling is obtained from the rectifier which is cooled by forced air flow. Air from the rectifier is forced out of cubicle 22 into enclosure 34, through it and enclosure 35 and then exhausted via grille 39. As this air flows through enclosure 35, it passes over the outer surface of the helical conductor and also over the inner surface of the conductor via the ducts between ribs 50. The reduced diameter of the bus portions 29 and 25 as compared to that of helical portion 27 provides open spaces at opposite ends of the ducts for free entry and exit of the cooling air.

Insulating tube 49 serves two main purposes. The first is to mechanically support the helix against sagging due to its own weight and due to short circuit forces. Its second function is to tie the two ends of the helix together to prevent rotation of these members relative to each other. This tendency to rotate is caused by thermal expansion of the helix under load and/or short circuit conditions. As the conductor heats, if unrestrained, it would tend to wind forward. By restraining the winding action, it will only increase in diameter. Under short circuit conditions, there is a mechanical force involved which tends to increase the diameter of the helix and this would tend to unwind the helix. Again by holding the ends fixed relative to each other, the only movement will be a change in diameter. In this particular case, the assembly is forced air-cooled and it is therefore desirable to divide the air flow evenly between two annular spaces, one present between the polyester glass cylinder and the inside of the helix, and the other present between the outside of the helix and the external enclosure. Hence, the introduction of the longitudinal support ribs between the polyester glass tube and the helix.

In order to reduce the space between helical conductor 27 and its enclosure 35, the inner surface of the enclosure is covered with an insulating material (not shown) such as a polyester glass fiber material sprayed onto the surface. This insulation permits reduced clearances between the live conductor and the dead enclosure and also helps to increase the effectiveness of the air passed over the conductor for cooling it.

In the FIG. 3 and 4 assembly, enclosure 35 is split axially into two halves and the halves formed with flanges 57 and 58 for securing them together. The spray of polyester glass applied to the inner surface of the enclosure is extended in-between the flanges as indicated at 59 and 60 in FIG. 4 so that the two enclosure halves are now insulated electrically one from the other. In the FIG. 3 assembly the axial length of conductor 27 is relatively short for the inductance obtained, i.e., the conductor has a large number of turns and the turns are at a small pitch. With such a small pitch, the major component of current is at right angles to the longitudinal axis of the enclosure and the minor component is in the direction of this axis. A one piece metal enclosure would therefore appear as a shorted turn to the major component of the current. As a result, the enclosure would tend to cancel out the reactance affecting the major current component. The net result, in effect, would be a much reduced reactance, only that influencing the minor current component. A split enclosure breaks up the current paths at right angles to the axis of the enclosure, thereby allowing the full reactance of the helical conductor to be effective for current limiting purposes.

The drawings and description have dealt with bus duct runs where each conductor has a separate enclosure, or stated otherwise, each bus bar is located inside a separate duct. In the case of a three-phase AC system, this is known as isolated phase bus duct, that is, each bus is isolated inside its own enclosure or duct. The invention may also be applied in non-isolated phase bus duct assemblies. In a non-isolated phase assembly, two or more bus bars are supported inside a single enclosure insulated from each other and the enclosure. U.S. Pat. No. 3,349,168— Swerdlow and Rehder shows a three phase non-isolated bus duct assembly in FIGS. 1 and 2 thereof. When a length of a tubular conductor shown in that patent is cut helically to provide a reactor according to the present invention, support for the helix can be provided by placing a strong insulating tube inside the helical conductor so as to hold the conductor turns in place in substantially the same manner as shown in the present application.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. In a bus duct run incorporating a current limiting reactor: a rigid, conductive, tubular enclosure; a rigid tubular conductor located inside said enclosure; insulators supporting said conductor in spaced relation to said enclosure; said tubular conductor having a portion along its length consisting of a helix having spaced-apart turns electrically connected in series with each other for conducting the current flowing in the tubular conductor, said helical portion serving as a reactor for current limiting purposes, both said enclosure and said conductor being generally circular in cross section and being generally coaxial, the portion of said enclosure surrounding the helical portion of said tubular conductor having its circular configuration interrupted by insulating means along its length that interrupts the current conductive paths around said enclosure portion.

2. In a bus duct run incorporating a current limiting reactor: a rigid, conductive, tubular enclosure; a rigid tubular conductor located inside said enclosure; insulators supporting said conductor in spaced relation to said enclosure; said tubular conductor having a portion along its length consisting of a helix having spaced-apart turns electrically connected in series with each other for conducting the current flowing in the tubular conductor, said helical portion serving as a reactor for current limiting purposes, both said enclosure and said conductor being generally circular in cross-section and being generally coaxial, and support means for said helical conductor portion comprising:
   a. an insulating tube located coaxially inside said helical conductor portion and supported by the portions of said tubular conductor at opposite ends of said helical portion, and
   b. a plurality of insulating ribs secured to and projecting radially outwardly from said insulating tube into contact with said helical conductor portion, said ribs extending longitudinally of said insulating tube and in circumferentially-spaced relationship to each other about the periphery of said insulating tube.

3. The bus duct run of claim 2 in which said ribs space said insulating tube from said helical conductor portion, thus providing ducts between said ribs along the internal surface of said helical conductor portion, and means is provided for driving cooling air through said ducts and through the space between said helical conductor portion and said surrounding enclosure, thereby cooling said helical conductor portion.

4. The bus duct run of claim 3 in which said portions of the tubular conductor at opposite ends of said helical conductor portion are of smaller diameter than said helical conductor portion, thus providing open spaces at opposite ends of said helical portion through which cooling air may freely enter and leave said ducts.

5. In a bus duct run incorporating a current limiting reactor: a rigid, conductive, tubular enclosure; a rigid tubular conductor located inside said enclosure; insulators supporting said conductor in spaced relation to said enclosure; said tubular conductor having a portion along its length consisting of a helix having spaced-apart turns electrically connected in series with each other for conducting the current flowing in the tubular conductor, said helical portion serving as a reactor for current limiting purposes, and a tube of insulating material located coaxially inside said helical conductor portion and supporting said helical conductor portion against displacement.

* * * * *